United States Patent Office
3,412,091
Patented Nov. 19, 1968

3,412,091
1,1-DIPHENYL-2-METHYL-3-(3,5-DIMETHYL-
MORPHOLINO)PROPANOLS
Robert Bruce Moffett, Kalamazoo, Mich., assignor to The
Upjohn Company, Kalamazoo, Mich., a corporation of
Delaware
No Drawing. Filed Mar. 14, 1966, Ser. No. 533,778
4 Claims. (Cl. 260—247.1)

This invention relates to new and useful chemical compounds and more particularly to 1,1-diphenyl-2-methyl-3-(3,5-dimethylmorpholino)propanol and the acid addition salts thereof.

The 1,1-diphenyl-2-methyl-3-(3,5-dimethylmorpholino) propanols of the present invention are represented by the formula:

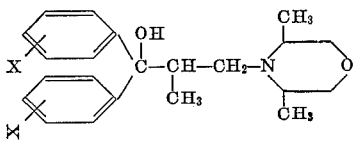

Formula I wherein X is a member selected from the group consisting of hydrogen, fluorine, chlorine, bromine, and lower-alkyl having from 1 to 4 carbon atoms, inclusive. Examples of lower-alkyl having from 1 to 4 carbon atoms, inclusive, are methyl, ethyl, propyl, butyl, and isomeric forms thereof.

Compounds of the Formula I can be prepared by reacting a phenyl Grignard reagent having the formula:

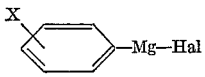

wherein X is as given above and "Hal" is halogen, preferably bromine or iodine, with a lower-alkyl 2-methyl-3-(3,5-dimethylmorpholino)propionate (preferably a methyl or ethyl ester) in an anhydrous solvent system, e.g., diethyl ether, diisopropyl ether, dibutyl ether, tetrahydrofuran and the like; decomposing the reaction mixture in a conventional manner such as by pouring the mixture into acidified ice water, e.g., hydrobromic or hydrochloric acid, preferably containing the same anion as the "Hal" in the Grignard reagent; and collecting the acid addition salt. The free base can be obtained by dispersing the acid addition salt in water and basifying the solution, e.g., with sodium hydroxide. The free base can be purified by conventional procedures such as by recrystallization from a suitable solvent, e.g., ethanol, acetone, methyl ethyl ketone, methylcyclohexane, and the like.

Acid addition salts of compounds of the Formula I can be prepared by neutralization of the free base with the appropriate amount of an inorganic or organic acid, examples of which are hydrochloric, hydrobromic, sulfuric, nitric, phosphoric, acetic, lactic, benzoic, salicyclic, glycolic, succinic, tartaric, maleic, malic, pamoic, cyclohexanesulfamic, citric and methanesulfonic acids, and like acids. The neutralization can be carried out by a variety of procedures known to the art to be generally useful for the preparation of amine acid addition salts. The choice of the most suitable procedure will depend on a variety of factors including convenience of operation, economic considerations, and particularly the solubility characteristics of the particular free base, the acid, and the acid addition salt. If the acid is soluble in water, the free base can be dissolved in water containing an equivalent amount of the acid, and thereafter, the water can be removed by evaporation; in some instances, the salt precipitates from the aqueous solution, particularly when cooled, and evaporation is not necessary. If the acid is soluble in a relatively non-polar solvent, for example, diethyl ether or diisopropyl ether, separate solutions of the acid and free base in such a solvent can be mixed in equivalent amounts, whereupon the acid addition salt will usually precipitate because of its relatively low solubility of the non-polar solvent. Alternatively, the free base can be mixed with an equivalent amount of the acid in the presence of a solvent of moderate polarity, for example, a lower alkanol, a lower alkanone, or a lower-alkyl ester of a lower alkanoic acid. Examples of these solvents are ethanol, acetone, and ethyl aceate, respectively. Subsequent admixture of the resulting solution of acid addition salt with a solvent of relatively low polarity, for example, diethyl ether or hexane, will usually cause precipitation of the acid addition salt. These acid addition salts are useful for upgrading the free bases.

The compounds of Formula I in the free base form are useful as acid acceptors in neutralizing undesirable acidity or in absorbing an acid as it is formed in a chemical reaction, for example, a dehydrohalogenation reaction in which hydrogen and chlorine, bromine, or iodine are removed from vicinal carbon atoms.

The fluosilicates of compounds of the Formula I (prepared by neutralizing the free bases with fluosilicic acid) are useful as mothproofing agents according to U.S. Patents 1,915,334 and 2,075,359. The thiocyanates (prepared by neutralizing the free base with thiocyanic acid) can be condensed with formaldehyde to form resinous materials useful as pickling inhibitors accoding to U.S. Patents 2,425,320 and 2,606,155.

The compounds of the Formula I also form salts with penicillins. These salts have solubility characteristics which cause them to be useful in the isolation and purification of penicillins, particularly benzyl penicillin. Said salts can be formed either by neutralization of the free base form of a compound of the Formula I with the free acid form of a penicillin, or by a metathetical exchange of the anion of an acid addition of a compound of the Formula I, for example, the chloride ion of a hydrochloride, with the anionic form of a penicillin.

The compounds of the Formula I have pharmacological activity as anticonvulsants and can be used to protect animals against thiosemicarbazide convulsions and nicotine convulsions and death.

The invention can be more fully understood by reference to the following examples which are given by way of illustration and not of limitation.

Example 1.—Methyl 2-methyl-3-(3,5-dimethyl-
morpholino)propionate

A solution of 63.0 ml. (0.63 mole) of methyl methacrylate, 72.5 g. (0.63 mole) of 3,5-dimethylmorpholine, and 18.2 ml. (0.32 mole) of acetic acid was heated on a stream bath for 3 days. After diluting with ether and filtering, the solution was washed successively with cold dilute sodium hydroxide solution, water, and saturated sodium chloride solution, and dried over anhydrous sodium sulfate. After filtration and removal of the solvent, the residue was distilled through a short (helices) column. A small forerun was removed and then the product distilled, giving 47.8 g. of methyl 2-methyl-3-(3,5-dimethylmorpholino)propionate as colorless liquid; B.P. 68° C./0.005 mm.; $n_D^{24}$ 1.4477.

Analysis.—Calcd. for $C_{11}H_{21}NO_3$: C, 61.36; H, 9.83; N, 6.51. Found: C, 61.25; H, 9.96; N, 6.62.

Example 2.—1,1-diphenyl-2-methyl-3-(3,5-dimethyl-
morpholino)propanol and salts thereof To 300 ml. of 3 M phenylmagnesium bromide in absolute ether was slowly added a solution of 47.8 g. (0.222 mole) of methyl 2-methyl-3-(3,5-dimethylmorpholino)propionate in 75 ml. of absolute ether. After stirring under reflux for 3 hours and standing overnight, the mixture was decomposed with ice water containing a slight excess of hydrobromic acid. Gummy 1,1-diphenyl-2-methyl-3-(3,5-dimethylmorpholino)propanol hydrobromide remained insoluble and was separated by decantation and washed with water and ether. This was converted to the free base with aqueous sodium hydroxide solution and the mixture was extracted with ether. The ether extract was washed with water, then with saturated aqueous sodium chloride solution, and dried over anhydrous sodium sulfate. Filtration and evaporation of the solvent gave 66.7 g. of 1,1-diphenyl-2-methyl-3-(3,5-dimethylmorpholino)propanol as a yellow syrup which did not crystallize. This was dissolved in 1.5 l. of absolute ether and acidified with ethanolic hydrogen chloride, giving 69.2 g. of 1,1-diphenyl - 2-methyl-3-(3,5-dimethylmorpholino)propanol hydrochloride; M.P. 90–98° C.

Example 3.—1,1-diphenyl-2-methyl-3-(3,5-dimethylmorpholino)propanol methanesulfonate About 48.5 g. of syrupy 1,1-diphenyl-2-methyl-3-(3,5-dimethylmorpholino)propanol free base prepared as in Example 2 was dissolved in 150 ml. of ethyl acetate and acidified with 13.7 g. (0.143 mole) of methanesulfonic acid. On standing crystals slowly separated, giving 19.5 g. of solid; M.P. 187–190° C. (dec.) This was recrystallized from 200 ml. of ethyl acetate and then from absolute ethanol, giving 1,1-diphenyl-2-methyl-3-(3,5-dimethylmorpholino)propanol methanesulfonate; M.P. 213° C. (dec.).

*Analysis.*—Calcd. for $C_{23}H_{33}NO_5S$: C, 63.43; H, 7.64; N, 3.22; S, 7.36. Found: C, 63.03; H, 7.47; N, 3.40; S, 7.41.

Following the procedure of the above Example 2 but substituting each of the following substituted-phenylmagnesium halides for the phenylmagnesium bromide used in the example:

2-chlorophenylmagnesium bromide,
3-chlorophenylmagnesium bromide,
4-chlorophenylmagnesium bromide,
3-bromophenylmagnesium bromide,
4-fluorophenylmagnesium bromide,
4-methylphenlymagnesium bromide,
2-ethylphenylmagnesium bromide,
4-isopropylphenylmagnesium bromide, and
4-sec.butylphenylmagnesium bromide, there can be respectively obtained:

1,1-bis(2-chlorophenyl)-2-methyl-3-(3,5-dimethylmorpholino)propanol,
1,1-bis(3-chlorophenyl)-2-methyl-3-(3,5-dimethylmorpholino)propanol,
1,1-bis(4-chlorophenyl)-2-methyl-3-(3,5-dimethylmorpholino)propanol,
1,1-bis(3-bromophenyl)-2-methyl-3-(3,5-dimethylmorpholino)propanol,
1,1-bis(4-fluorophenyl)-2-methyl-3-(3,5-dimethylmorpholino)propanol,
1,1-bis(4-methylphenyl)-2-methyl-3-(3,5-dimethylmorpholino)propanol,
1,1-bis(2-ethylphenyl)-2-methyl-3-(3,5-dimethylmorpholino)propanol,
1,1-bis(4-isopropylphenyl)-2-methyl-3-(3,5-dimethylmorpholino)propanol, and
1,1-bis(4-sec.butylphenyl)-2-methyl-3-(3,5-dimethylmorpholino)propanol, as free bases and hydrobromides and hydrochlorides. The free bases can be converted to methane sulfonates in accordance with the procedure of the above Example 3.

What is claimed is:

1. A compound selected from the group consisting of compounds having the formula:

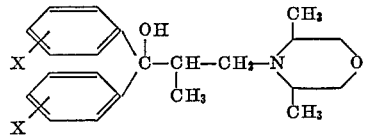

wherein X is a member selected from the group consisting of hydrogen, fluorine, chlorine, bromine, and lower-alkyl having from 1 to 4 carbon atoms, inclusive, and the acid addition salts thereof.

2. The compound of claim 1 wherein the compound is 1,1 - diphenyl-2-methyl-3-(3,5-dimethylmorpholino)propanol.

3. The compound of claim 1 wherein the compound is 1,1 - diphenyl-2-methyl-3-(3,5-dimethylmorpholino)propanol methanesulfonate.

4. The compound of claim 1 wherein the compound is 1,1 - diphenyl-2-methyl-3-(3,5-dimethylmorpholino)propanol hydrochloride.

References Cited

Stelt et al.: Chemical Abstracts, vol. 62, page 14,543 (1965).

Henelka et al.: Chemical Abstracts, vol 55, page 16,492 C (1961).

NICHOLAS S. RIZZO, *Primary Examiner.*

JOSE TOVAR, *Assistant Examiner.*